United States Patent [19]
Bouton et al.

[11] Patent Number: 5,611,731
[45] Date of Patent: Mar. 18, 1997

[54] VIDEO PINBALL MACHINE CONTROLLER HAVING AN OPTICAL ACCELEROMETER FOR DETECTING SLIDE AND TILT

[75] Inventors: Frank M. Bouton, Beaverton; Stephen T. Kaminsky, Salem, both of Oreg.

[73] Assignee: Thrustmaster, Inc., Hillsboro, Oreg.

[21] Appl. No.: 525,904

[22] Filed: Sep. 8, 1995

[51] Int. Cl.$^6$ ........................................ A63F 7/24
[52] U.S. Cl. ............................. 463/37; 463/2; 463/3; 463/5; 463/49; 273/148 B
[58] Field of Search .................. 463/1–3, 5, 30–31, 463/36–39, 49, 53–54, 56; 273/148 B, 118 A, 119 A, 121 A

[56] References Cited

U.S. PATENT DOCUMENTS

| Re. 28,507 | 8/1975 | Rausch | 463/3 |
|---|---|---|---|
| 3,358,150 | 12/1967 | Summer | 250/227 |
| 3,480,788 | 11/1969 | Barbieri et al. | 250/237 |
| 3,723,934 | 3/1973 | Kubitzek et al. | 338/15 |
| 3,778,058 | 12/1973 | Rausch | 463/3 |
| 3,859,617 | 1/1975 | Oka et al. | 338/15 |
| 3,878,500 | 4/1975 | Svechnikov | 338/15 |
| 4,276,534 | 6/1981 | Meyer et al. | 338/15 |
| 4,334,679 | 6/1982 | Doyle et al. | 463/3 |
| 4,359,223 | 11/1982 | Baer et al. | 463/2 |
| 4,796,000 | 1/1989 | Mondl | 338/15 |

OTHER PUBLICATIONS
User Manual entitled "Full Tilt! Pinball", by Maxis.

*Primary Examiner*—Jessica Harrison
*Assistant Examiner*—Mark Sager
*Attorney, Agent, or Firm*—Marger, Johnson, McCollom & Stolowitz, P.C.

[57] ABSTRACT

The invention comprises a controller that includes a base, a handle mounted on the base, a flipper switch mounted at a distal end of the handle, and having two optical accelerometers mounted within a cavity of the handle for detecting the force applied to the controller. Each optical accelerometer includes a light source, a light detector, and a shield having a pattern formed thereon that varies from the first end of the shield to a second end of the shield so as to allow an increasing amount of light to pass through the shield as the shield moves from its first end to its second end. The shield is pivotally mounted between the light source and the light detector so that the force applied to the handle causes the shield to pivot thereby allowing a varying amount of light to be passed from the light detector through the shield to the light source. Thus, the amount of light detected by the light source is a function of the amount of deflection of the shield, which is further a function of the amount of force applied. The pattern formed on the shield can take a variety of forms. In the preferred embodiment the pattern is a progressive grey scale pattern that goes from a ten percent grey scale at the first end to a ninety percent grey scale at the second end. The pattern can also comprise a slot that has a width that varies increasingly from the second end to the first end of the shield.

48 Claims, 11 Drawing Sheets

VIDEO PINBALL MACHINE CONTROLLER HAVING AN OPTICAL ACCELEROMETER FOR DETECTING SLIDE AND TILT

BACKGROUND OF THE INVENTION

This invention relates generally to video games and more particularly to video game controllers.

There have been significant advances made in the realism of video games. Several factors have contributed to this increased realism. The availability of high-performance, low-cost computer hardware has driven this trend. The performance of personal computers continues to increase at a rapid rate while at the same time the cost of these computers continues to fall. The performance has in turn been driven by advances in microprocessor and memory designs. The clock rates of modern microprocessors, the heart of all personal computers, are now well in excess of 100 MHz. These speeds allow personal computers to process more and more data, which is particularly important in such graphic intensive applications as video games. In addition, dynamic random access memory (DRAM) densities continue to increase. Another driving force has been the improvements in software techniques, particularly in the area of graphics. New algorithms allow for real-time manipulation of large amounts of data.

One of the most important factors that has contributed to the realism of video games is the availability of realistic controllers for these video games. In the past, most control of these video games was done via the computer keyboard. Using the computer keyboard, the user was required to input a particular keystroke or number of keystrokes to produce the desired response of the video game. This technique was used for almost all personal computer-based video games such as flight simulators, racing simulators, golf simulators, and pinball machine simulators. Since that time, there have been significant advancements in the area of game controllers. For flight simulators, Thrustmaster, Inc., of Portland, Oreg., has developed an array of realistic game controllers as disclosed in U.S. Pat. Nos. 5,396,267 and 5,389,950. Those controllers include a joystick modelled after the F16 fighter stick, which includes a multiplicity of hand-actuated switches, a split throttle controller that controls the thrust of the plane, and even a set of rudder control pedals that are controlled by the user's feet. All these controllers connect directly to the personal computer either through the keyboard port or the industry-standard game port of the personal computer, or both. These controllers have added significantly to the realism of flight simulator video games because they provide the user with the same controls that would be used in an actual plane.

The joystick and throttle have replaced the keyboard as the preferred input mechanism for many video games besides flight simulators. Although designed primarily for flight simulator video games, the joystick is sufficiently realistic for certain other games such as car racing simulators or motorcycle racing simulators.

The joystick and throttle are not realistic, however, for many other video games such as golf simulators or pinball machine simulators. As a result, users still must rely on the keyboard as a primary control device for these video games. This detracts significantly from the realism of the game.

Designing a realistic game controller for a pinball machine simulator presents some unique problems not encountered by either the joystick or the throttle controllers for flight simulators. As most pinball machine players know, the machine can withstand a certain amount of movement caused by the user during play. Such movement is referred to as "slide." If the user applies too much force to the pinball machine, however, this will cause a "tilt" condition which typically shuts down the machine. This feature permits a certain amount of body English to be used without permitting the user to dominate the machine by excessive force. The tilt condition is typically detected using a pendulum hanging down between an annular ring. If no force is applied to the machine, the ring and pendulum maintain a certain spacing. When force is applied to the machine, the ring moves toward the pendulum. If too much force is applied, the ring will actually touch the pendulum thereby creating a short circuit between the pendulum and the ring. The short circuit results in a tilt condition.

This technique of detecting "slide" and "tilt" cannot readily be adapted to a video game controller. The pendulum approach provides only two conditions: tilt and no tilt. The pendulum does not provide any information about the permissible slide. Instead, the body English is conveyed to the machine through the actual movement of the pinball machine. Therefore, although the pendulum approach could be incorporated into a video game controller to provide tilt/no tilt information to the computer, a different approach must be taken to provide the slide information.

Some video game manufacturers have tried to simulate "slide" by providing a keystroke such as the spacebar, which simulates a predetermined force being applied to the machine. There are several problems with this approach. First, it is not kinetically realistic, which is the goal of a simulator. The amount of force applied by the video game is not a function of the amount of force applied to the keyboard; instead, it is a function of the number of keystrokes applied within a given period of time. Second, there is little control over the directionality of the force applied. A given keystroke applies the same force in the same direction each time.

Accordingly, a need remains for a pinball machine controller for a video pinball machine simulation program running on a personal computer that provides the computer with not only tilt/no tilt information but also slide information.

SUMMARY OF THE INVENTION

It is, therefore, an object of the invention to provide a realistic simulator controller for a video pinball machine simulator.

Another object of the invention is to provide both "tilt" and "slide" information to the simulator.

The invention comprises a hand-held game controller for pinball machine computer simulation that includes a base, a handle mounted on the base, a flipper switch mounted at a distal end of the handle, and an optical accelerometer mounted within a cavity of the handle operative to provide control signals to the computer. The shape of the handle is such that it allows the user to actuate the flipper switch with the user's index finger while grasping the handle with the user's remaining fingers. The optical accelerometer detects the amount of force applied to the controller by the user and supplies that force information to the personal computer. The optical accelerometer provides a variable amplitude signal that is proportional to the amount of force applied to the controller. This optical accelerometer includes a light source, a light detector, and a light beam modulator positioned between the source and detector and movable in response to an accelerative force to vary the light beam intensity received by the detector.

The modulator can be a shield having a pattern formed thereon that varies from the first end of the shield to a second end of the shield so as to allow an increasing amount of light to pass through the shield to the detector as the shield pivots responsive to the accelerative force. The shield is pivotally mounted in the handle relative to the light source and the light detector so that the force applied to the handle causes the shield to pivot, thereby allowing a varying amount of light to be passed from the light detector through the shield to the light source. Thus, the amount of light detected by the light source is a function of the amount of deflection of the shield, which is further a function of the amount of force applied. The shield is encased in a plastic casing to provide a predetermined amount of mass to the shield. The pattern formed on the shield can take a variety of forms. In the preferred embodiment, the pattern is a progressive grey scale pattern that goes from a ten percent (10%) grey scale at the first end to a ninety percent (90%) grey scale at the second end. Thus, at the first end, substantially all of the light from the light source can pass through to the light detector, whereas at the second end little light is permitted to pass to the light source. The pattern can also comprise a slot that has a width that varies increasingly from the second end to the first end of the shield.

The light source preferably includes a light emitting diode and a resistor connected in series therewith. The light detector preferably includes a phototransistor that generates a current that is proportional to the amount of light received thereby. By using a single phototransistor and three resistors, the output of the light detector can be coupled directly to an analog input of an industry-standard game port in an IBM compatible personal computer.

A video pinball simulation system is also described according to the invention. The system includes a personal computer having an industry-standard game port and a microprocessor. Running on the personal computer is a pinball simulation software program that simulates a pinball machine. Two controllers, according to the invention, are coupled to the industry-standard game port to provide two sets of input: discrete inputs from the flipper switches and analog or variable inputs from the optical accelerometers. The pinball simulation software then uses these inputs to produce a corresponding change in the images displayed by the personal computer. The discrete signals cause the pinball simulation software to actuate the flippers while the analog signal information used by the pinball simulation software to simulate the "slide" of the simulated pinball machine table. The pinball simulation software also includes a predetermined level, however, which the analog signal cannot exceed without causing a tilt condition. Thus, the video pinball machine controller according to the invention provides both tilt and slide information to the personal computer to allow for realistic video pinball machine simulation.

The foregoing and other objects, features and advantages of the invention will become more readily apparent from the following detailed description of a preferred embodiment of the invention which proceeds with reference to the accompanying drawings.

DETAILED DESCRIPTION

I. VIDEO PINBALL MACHINE CONTROLLER

Figure 1:
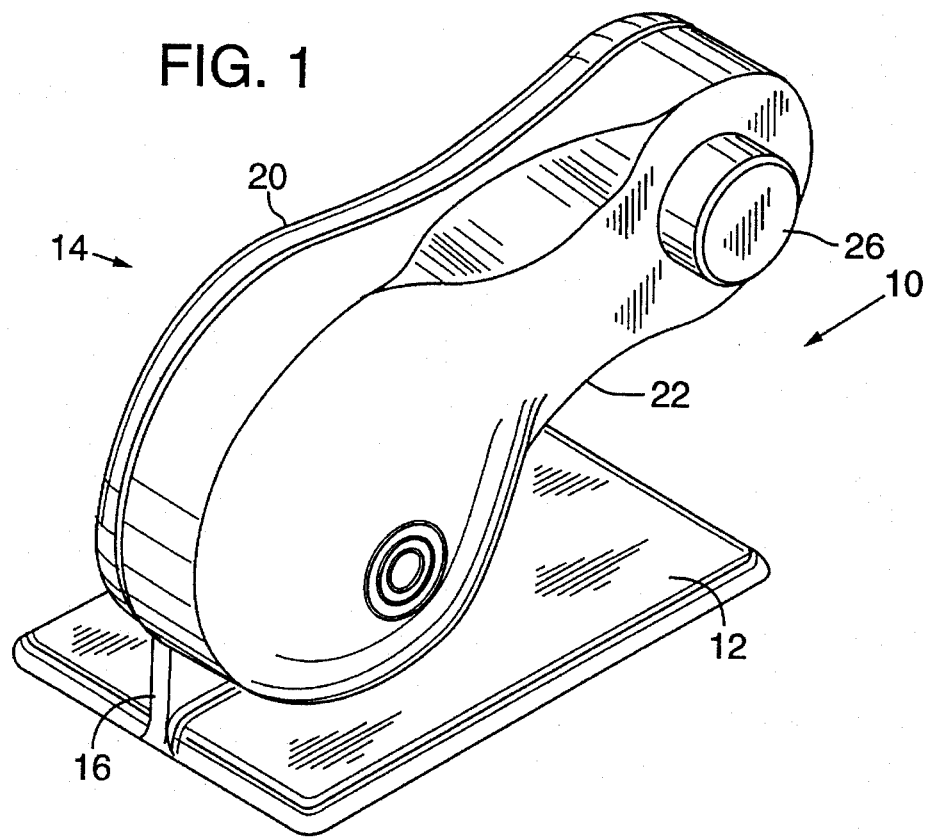
FIG. 1 is a top perspective view of a video pinball machine game controller.
Figure 2:
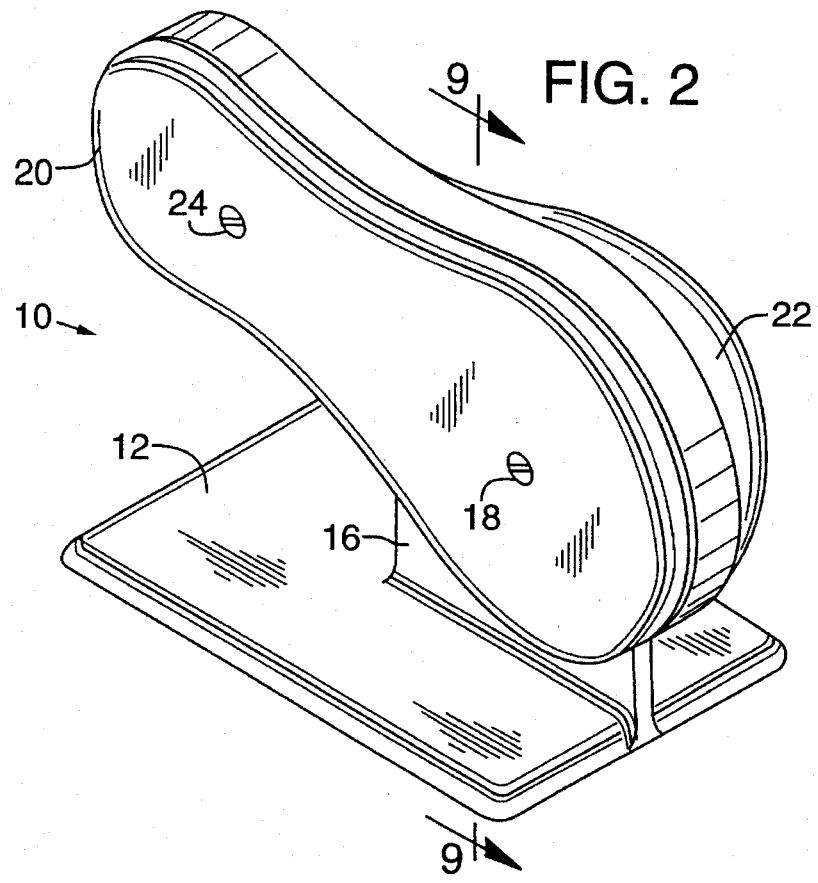
FIG. 2 is a top perspective view thereof showing the opposite side of the controller of FIG. 1.
Figure 3:
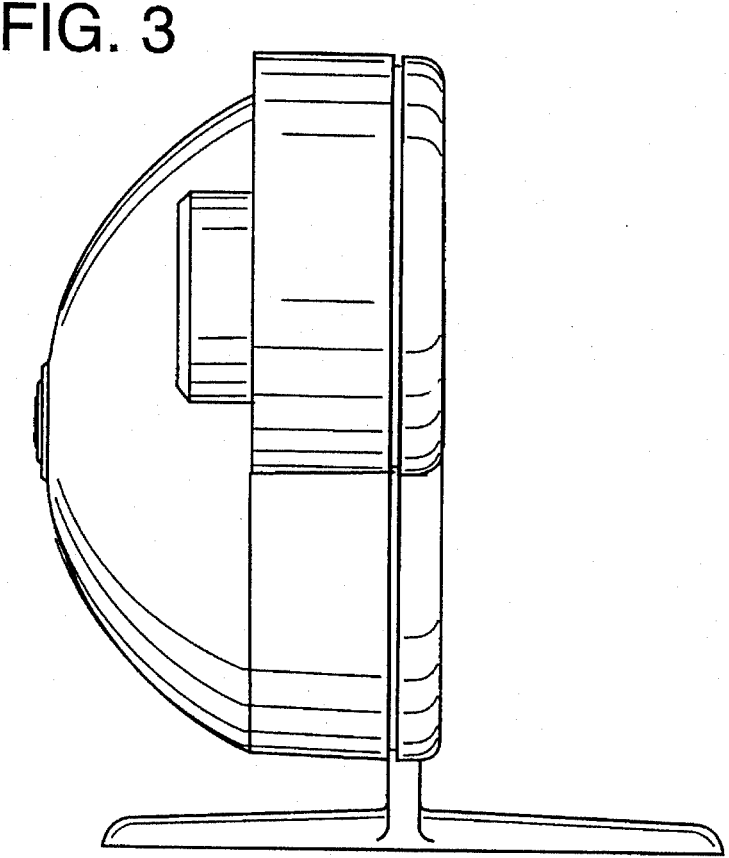
FIG. 3 is a front elevational view thereof.
Figure 4:
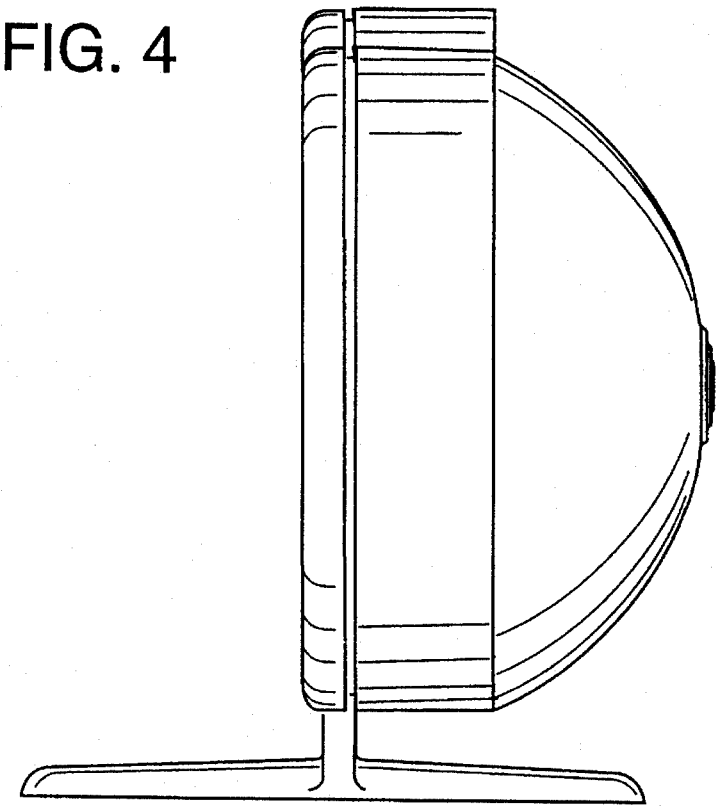
FIG. 4 is a rear elevational view thereof.
Figure 5:
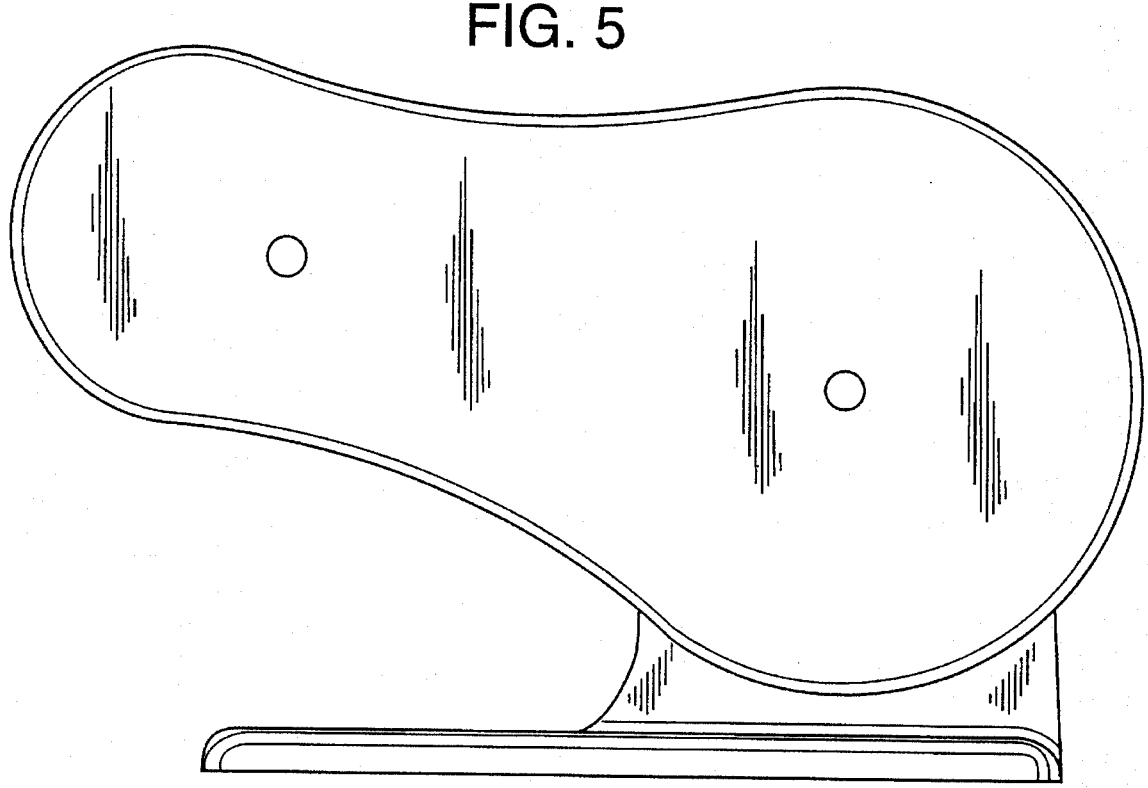
FIG. 5 is a left side elevational view thereof.
Figure 6:
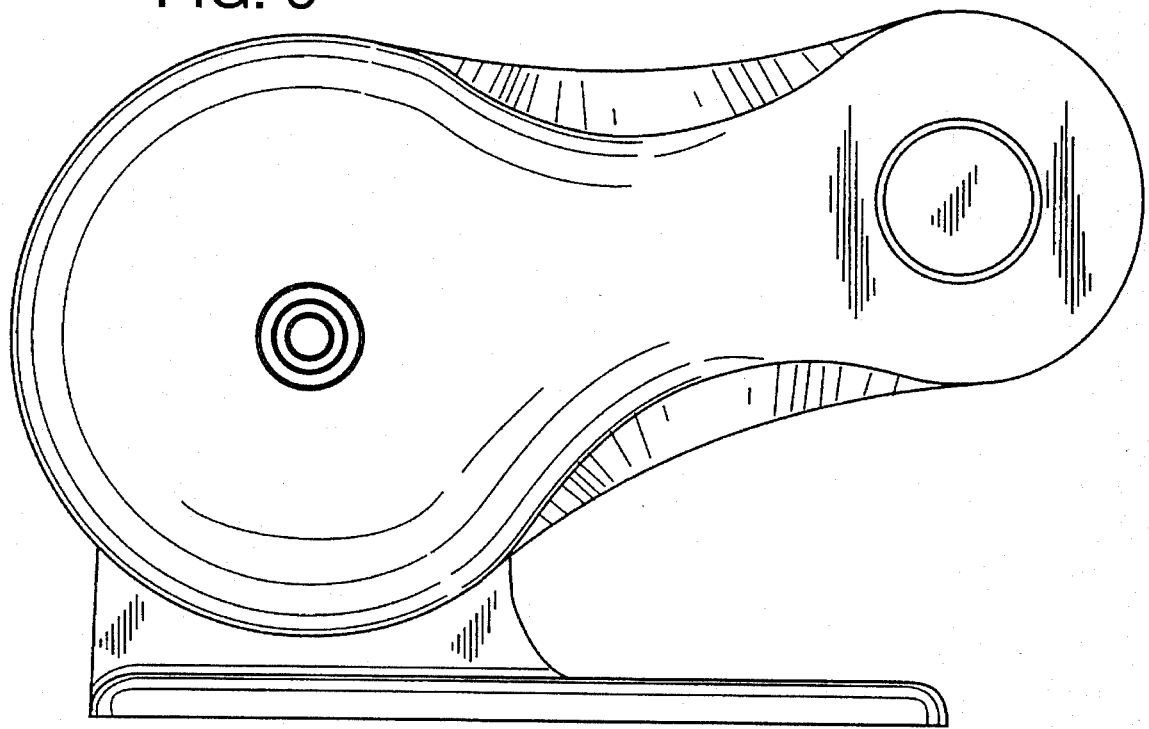
FIG. 6 is a right side elevational view thereof.
Figure 7:
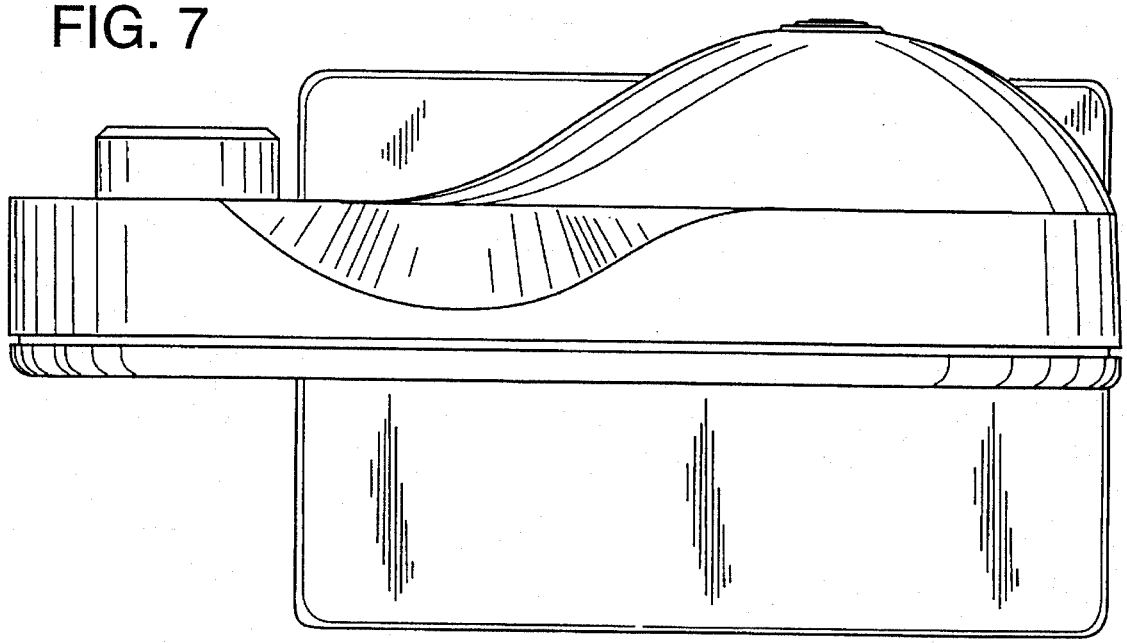
FIG. 7 is a top plan view thereof.
Figure 8:
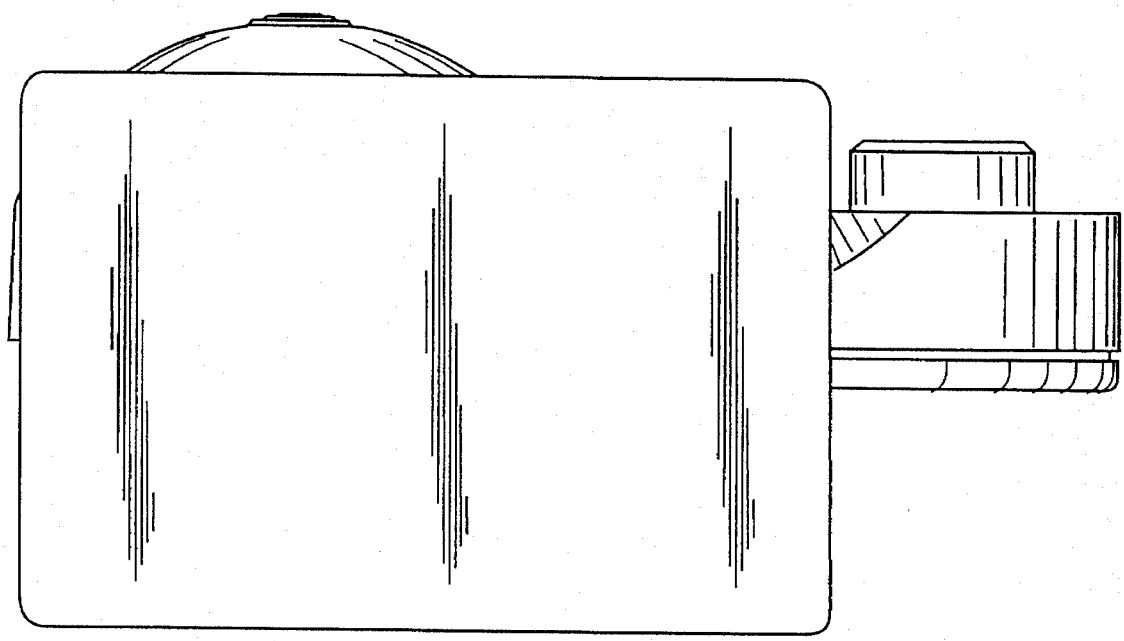
FIG. 8 is a bottom plan view thereof.

FIGS. 1–8 show, in perspective and orthogonal views, a video pinball machine controller 10 according to the invention. The controller 10 includes a longitudinal support base 12, a handle 14 mounted on the base, and a cable (shown in FIG. 18) coupled to the handle. The handle is mounted on the base by an upright pedestal 16 that is preferably formed as an integral part of the base 12. The handle 14 is mounted to the pedestal 16 by means of a screw 18 connected therebetween. The handle 14 is mounted so as to be offset from the horizontal base by an acute angle. There is a crease formed between the pedestal 16 and the base 12 to allow the cable to exit the handle.

The handle 14 is formed as an oblong housing comprising two separate pieces: a back plate 20 and a front cover 22. The back plate is secured to the cover by means of screws 18 and 24. The housing of handle 14 is oblong shaped, with a larger dome-shaped palm rest portion 23 and a smaller actuator portion 25 having a flipper switch 26 located for actuation by a user's index finger. The handle is approximately as long as a typical user's hand so as to allow the user's palm to rest on the large dome-shaped portion of the cover while permitting the user's index finger to actuate a dual-stage flipper switch 26 mounted on the handle at a distal end thereof. The housing is contoured for the user's thumb to fit conformably over the handle and the user's ring and little finger to curl under the handle. The flipper switch 26 is a discrete two-stage, push button type switch that, in the preferred embodiment, controls a flipper of a video pinball simulator.

The cable (see FIG. 18) includes a connector that is compatible with an industry-standard game port on a personal computer, as described further below with reference to FIG. 18. Internal to the cable are a plurality of individual conductors for transmitting signals from the input devices, e.g., flipper control switch 26, to a personal computer. These conductors are connected to an actuation circuit (see FIG. 17) housed in the handle 14. Alternatively, an infrared (IR) or radio frequency (RF) interface can be used in place of the cable as a means for transmitting the signals from the accelerometers and flipper control switches to the personal computer. In that case the personal computer would be required to have a compatible interface.

Figure 10:
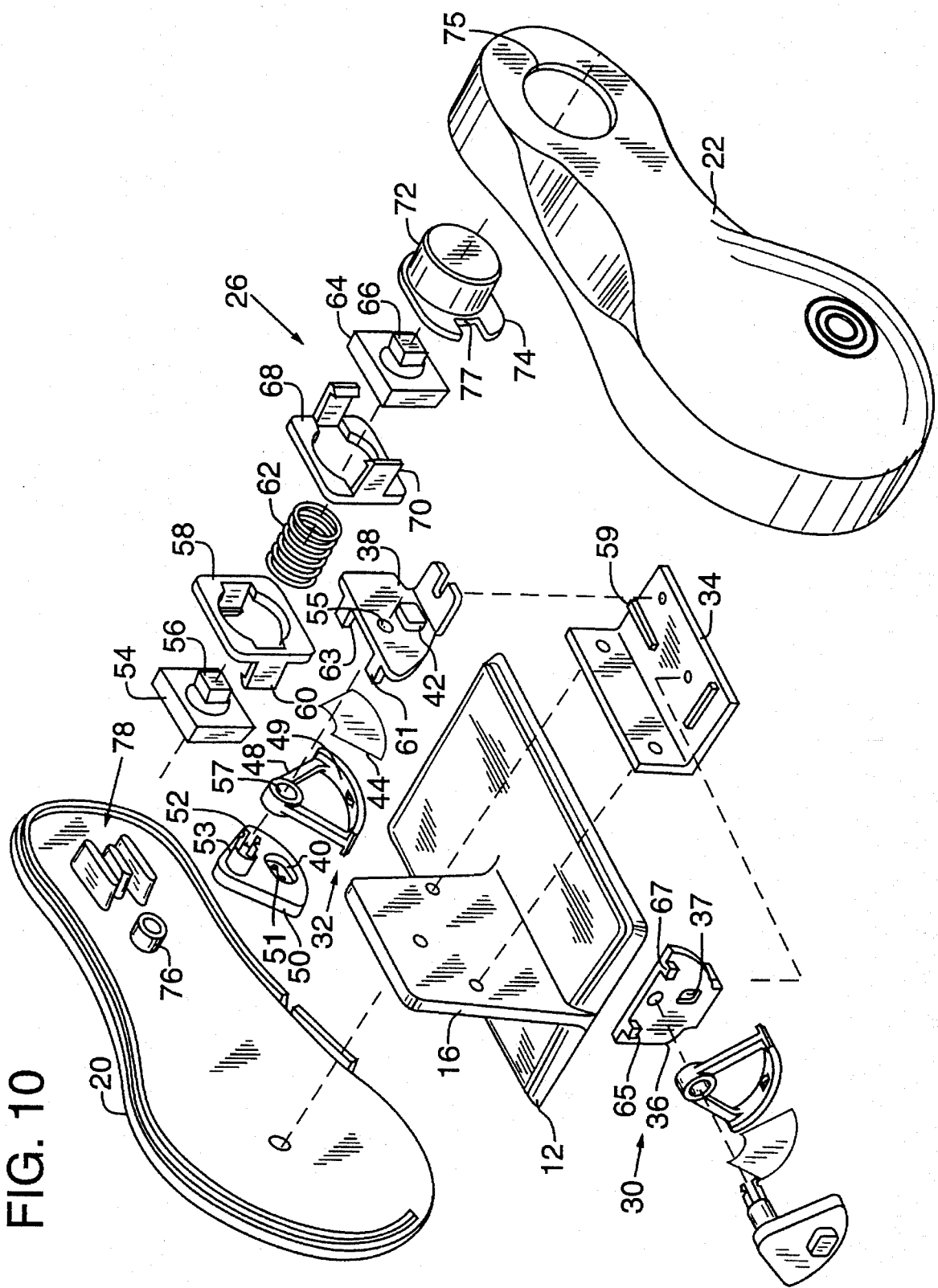
FIG. 10 is an exploded perspective view of the controller of FIG. 1.

An exploded view of the controller 10 is shown in FIG. 10. Two optical accelerometers 30 and 32, according to the invention, are mounted on the handle within a cavity formed between the back plate 20 and cover 22. These optical accelerometers, as they are referred to herein, detect a force applied to the controller and convert this force into two signals representing the components of that force along two perpendicular horizontal axes. These signals are then transmitted over the cable to a personal computer, which reads these signals and produces a corresponding response in a video pinball simulation program running thereon. These signals thus convey the "slide" and "tilt" information to the personal computer.

Figure 9:
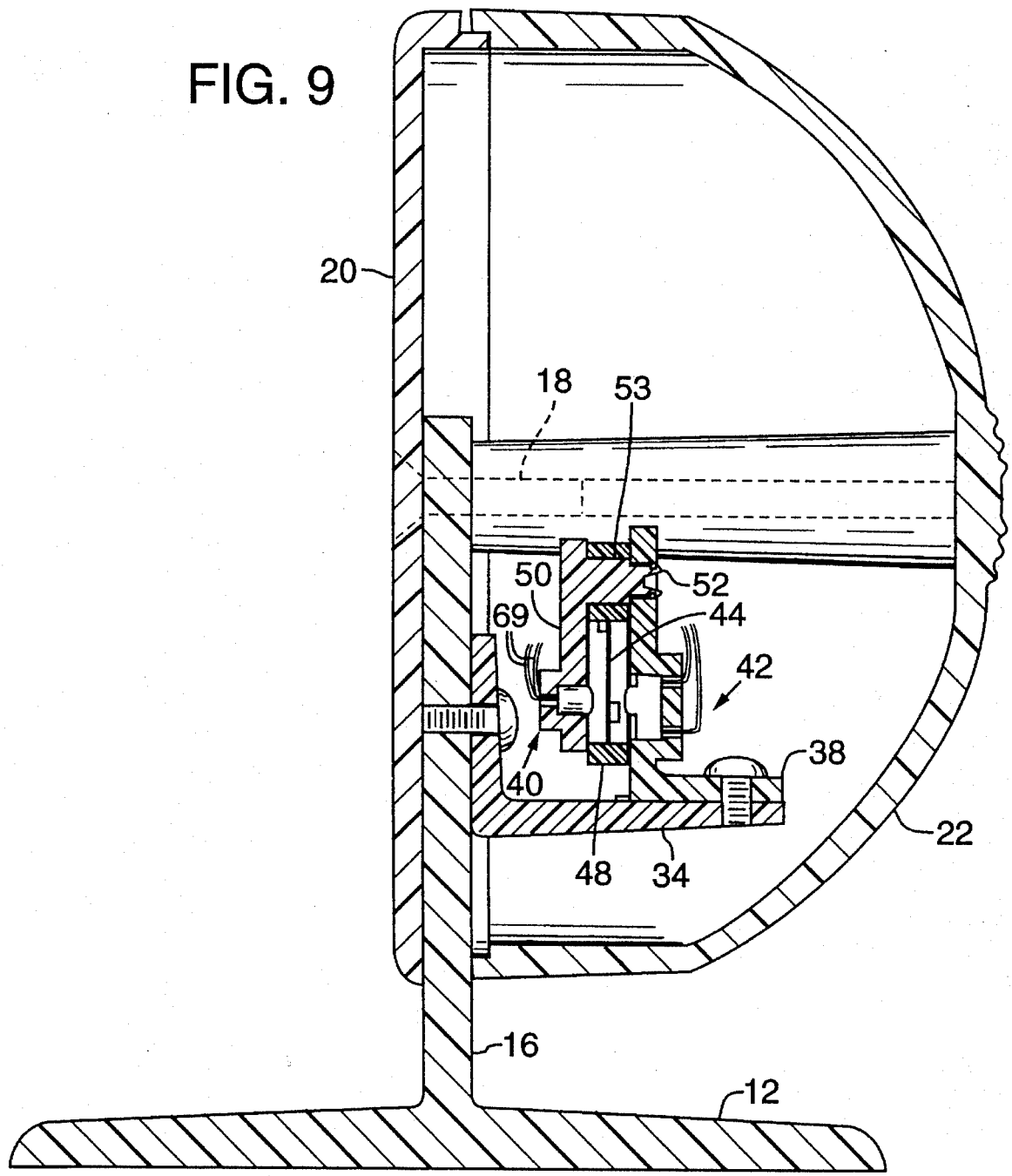
FIG. 9 is a cross section of the controller taken along lines 9—9 in FIG. 2.

The optical accelerometers 30 and 32 are mounted on an angle bracket 34, which is attached to pedestal 16, by means of mounting brackets 36 and 38, respectively. The mounting brackets 36 and 38 are oriented with respect to each other by 90 degrees so that the optical accelerometers will detect forces applied along perpendicular horizontal axes. This allows the accelerometers to decompose any force applied to the handle by the user into two orthogonal force vectors. The mounting brackets 36 and 38 are properly aligned by alignment steps such as step 59 so that an opening in a flange in the bracket aligns with a corresponding screw hole in the angle bracket. A screw is then used to secure the brackets 36 and 38 to the angle bracket 34, as shown in FIG. 9.

The following description of accelerometer 32 applies as well to accelerometer 30, which is identical, except for its location. Accelerometer 32 is mounted in one orientation and accelerometer is similarly mounted at a right angle to accelerometer to detect the force applied to the handle normal to orthogonal axes. The optical accelerometer 32 is comprised of essentially four basic elements: a light source 40, a light detector 42 fixedly mounted on the handle, a shield 44 pivotally mounted between the source and detector, and sufficient mass to react to an accelerative force to deflect the shield from a rest position. Although the shield and mass are described as separate elements, alternatively the shield itself could provide the mass if the shield is formed of suitable material.

Figure 15:
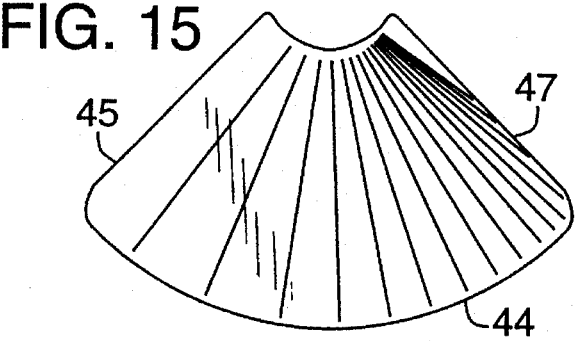
FIG. 15 is an enlarged plan view of a first embodiment of an optical shield of the controller of FIG. 10.

The shield is in the form of a quadrant, i.e., one quarter of an annulus. In a first embodiment of the shield shown in FIG. 15, the shield is made of a translucent plastic material that is lightweight and has a grey scale pattern formed thereon that varies in density from a first end of the shield 45 to a second end of the shield 47. The pattern density increases moving from the first end to the second end to allow a decreasing amount of light to pass through the shield. In the preferred embodiment shown in FIG. 15, this grey scale pattern density increases from a ten percent (10%) grey scale at the first end 45 to a ninety percent (90%) grey scale at the second end 47. Different ranges of density could also be used (e.g., 20%–80%).

Figure 16:
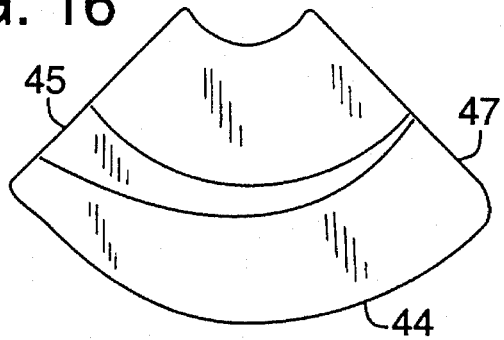
FIG. 16 is an enlarged plan view of a second embodiment of an optical shield of the controller of FIG. 10.

A second embodiment of the pattern is shown in FIG. 16. In this alternative embodiment, the shield has a pattern in the form of a slot, which has a width that increases moving from the second end 47 to the first end 45. Other patterns can be used to form the variable density pattern such as dots or bars of different spacings or sizes that modulates the light responsive to the accelerative force.

The shield 44 is encased in a plastic casing or frame 48 to provide a predetermined mass to the shield. The shield snaps into the frame and is held therein by a protrusion 49 extending away from an inner wall of the frame. The mass of the frame and shield combination can be used to calibrate the signals generated by the optical accelerometers. As will be described further below, the amount of rotation of the shield from a null position in the gravitational field is a function of the amount of acceleration experienced by the controller normal to the axis that the accelerometer is mounted on. The force applied can then be determined by multiplying the mass of the shield and frame combination by the measured acceleration.

Figure 11:
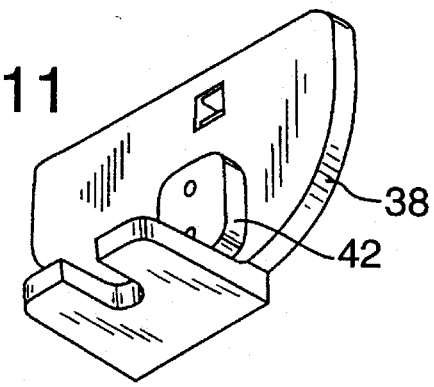
FIG. 11 is an enlarged perspective view of a light detector, mounting plate and bracket of the controller of FIG. 10.
Figure 12:
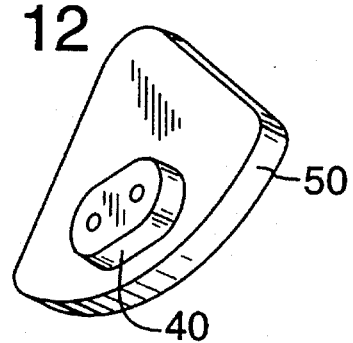
FIG. 12 is an enlarged perspective view of an light source and mounting plate of the controller of FIG. 10.
Figure 13:
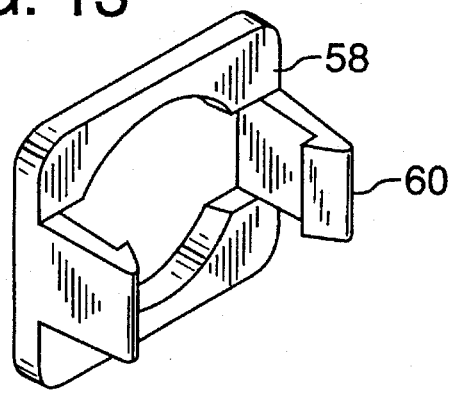
FIG. 13 is an enlarged perspective view of a switch housing of the controller of FIG. 10.

Referring also to FIG. 11, the light detector 42 is mounted on the bracket 38 opposite an opening formed therein (not visible) so that light emitted by the light source 40 travels through the opening. The corresponding opening 37 on bracket 36 can more clearly be seen. The light source 40 is juxtaposed to an opening 51 formed in a holder 50, as also shown in FIG. 12, which is in the shape of a quadrant. The holder 50 includes two fingers 52 that are received in a hole 55 formed in the bracket 38. The fingers 52 are formed on the end of a stem 53 which is received in a hole 57 in frame 48 and thereby forms the axis of rotation for the frame 48 and shield 44.

The fingers 52 secure the holder 50 to the bracket 38 so that the bracket does not move relative to the holder. The holder 50 is positioned relative to the bracket 38 so that the light source 40 is aligned with the light detector 42, as shown in FIG. 9. The assembled accelerometer 32 is mounted on bracket 34 in one orientation and accelerometer 30 is similarly mounted at a right angle to accelerometer 32.

The frame 48 can pivot freely about stem 53 within a predetermined angular range. When the base 12 is mounted on a horizontal surface, the frame hangs in a position such that the light passes through the shield's midpoint, i.e., half way between the first and second ends of the shield. The angular range of rotation is set by two stops 61 and 63 mounted on the bracket 38 on opposite sides of the frame 48. Bracket 36 similarly includes stops 65 and 67. In the preferred embodiment, one stop 61 limits the travel of the frame 48 to approximately 35 degrees in one direction relative to the frame's neutral "at rest" position, while the other stop 63 limits the travel to 35 degrees in the opposite direction. The range of motion can be changed by adjusting the position of the stops accordingly.

Alternatively, the "at rest" position of the shield could be at one end or the other of the shield and the shield could swing through its full range of motion responsive to an applied force along the respective axis. The stops would have to be relocated accordingly. In this case, the signal produced by the accelerometer in the "at rest" position would be either a maximum signal or a minimum signal depending on which end of the shield corresponded to the "at rest" position.

In use, the optical accelerometers 30 and 32 detect a force applied to the controller. The perpendicular accelerometers decompose that force into two orthogonal force vectors. The optical accelerometers detect the force by measuring the amounts of deflection of the shields from a null position as a result of the force. When a force component is applied along one of the axes, the respective shield deflects upward thereby changing the pattern that is between the light source and the light detector. The associated stop (e.g., 63) limits the travel of the shield. Any bounce or oscillation of the frame can be filtered out by software running in the personal computer.

In the preferred embodiment, the shield is positioned so that, as the shield deflects clockwise (CW), an increasing amount of light is detected by the photodetector. This increasing amount of light produces a corresponding increase in the signal level generated by the photodetector, whose signal is proportional to the light received. This signal is then transmitted to a personal computer over the game port, which converts this signal level to a force. It should be apparent that the shield can be reversed so that a decreasing amount of light can be passed as the shield deflects clockwise.

The controller further includes a two-stage flipper switch 26. The flipper switch 26 includes two switches: a first switch 64 and a second switch 54. Both switches 64 and 54 have actuator stems 66 and 56, respectively. The switch 54 is received in a switch holder 58 that includes a pair of legs 60 that retain the switch therein as shown in FIG. 10. The legs 60 include inwardly facing lips that extend over a backside of the switch base when the switch is inserted therein to hold the switch in place. The switch 54 and holder 58 rest against protrusions 78 on the inner side of back plate 20. Switch 64 is similarly held by a switch holder 68 except that the inwardly facing lips extend over a front side of the switch base having the actuator stem 66.

A spring 62 is interposed between the back side of switch 66 and the front side of switch 54. The switch is held in place by an opening in the switch holder 58 and therein circumscribes the actuator stem 56. The spring 62 collapses to a height less than that of the actuator stem responsive to a predetermined force. The force required to collapse the spring is greater than the force required to actuator the first switch 64, which produces a two-stage trigger action, as described further below.

A cylindrical switch plunger 72 having a concave front face is juxtaposed to the switch holder 68 for actuating the second switch 64. The plunger 72 includes a base lip 74 that extends radially around the perimeter of the inner end of plunger 72. The plunger is received in an opening 75 in the handle cover 22 and the lip 74 rests on the inner side of cover 22 to retain the plunger therein. The lip 74 further includes a notch 77 that fits over an annular sleeve (not visible) protruding inward from the inside wall of the cover to receive screw 24. The sleeve is aligned with collar 76 when the handle is assembled.

The plunger 72 actuates the switch 64 responsive to a first amount of force applied to the plunger, usually by the user's index finger. If the user applies an additional amount of force to the plunger, the back side of switch 64 causes spring 62 to compress until it finally collapses. Once the spring collapses the backside of switch 64 depresses actuator stem 56 thereby actuating the second switch 54.

Signals are generated by the actuation of these switches, which are then transmitted by a cable (see FIGS. 17 and 18) to a personal computer. The personal computer responds to these signals by actuating various functions in the pinball video simulator. In the preferred embodiment, the signal from switch 64 activates a lower flipper switch while the signal from switch 54 actuates an upper flipper switch in order to simulate those pinball machines having two sets of flippers.

Figure 17:
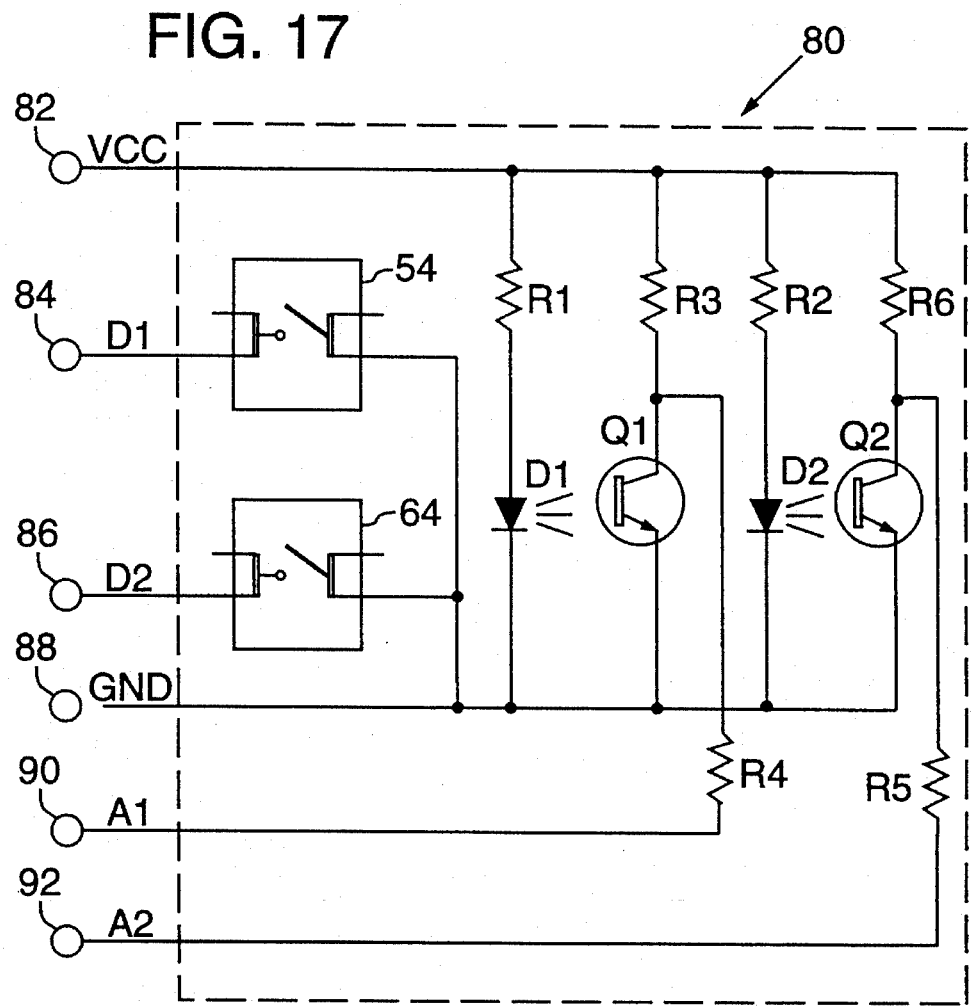
FIG. 17 is a schematic diagram of the electronic circuitry of the controller of FIG. 1.

An electrical circuit 80 of the controller is shown in the schematic diagram of FIG. 17. The circuit includes the two discrete switches 54 and 64 of the two stage trigger and the two accelerometers 30 and 32. Accelerometer 30 includes a light source comprising light emitting diode (LED) D1 in series with resistor R1 and a light sensor comprising phototransistor Q1 and two associated resistors R3 and R4. Resistor R3 is coupled between the collector of Q1 and terminal 82 (VCC), while R4 is coupled between the collector of Q1 and terminal 90 to provide the first analog signal A1 to the game card. The emitter of Q1 is coupled to terminal 88 (GND). An optional emitter degeneration resistor (not shown) can be interposed between the emitter and terminal 88. Similarly, accelerometer 32 includes a light source comprising light emitting diode D2 in series with resistor R2 and a light sensor comprising phototransistor Q2 and associated resistors R5 and R6. The resistors R5 and R6 are coupled to Q2 in a similar manner as as resistors R4 and R3, respectively, are to Q1. Other light sources and/or light detectors can be used as would be apparent to those skilled in the art.

The diode and resistor pairs are coupled between a supply voltage VCC received at terminal 82 and a ground voltage GND coupled to terminal 88. In practice, each resistor is soldered to one of the terminals of the respective light source. Phototransistor Q1 is coupled between supply terminal 82 and a first analog terminal 90 for producing a first analog signal A1. Likewise, phototransistor Q2 is coupled between supply terminal 82 and a second analog terminal 92 for producing a second analog signal A2. The analog signals A1 and A2 are currents that are proportional to the amount of light received by the phototransistor. The use of these components permits the controller to be electrically compatible with the industry-standard game port comprised of terminals 82–92.

Each shield (not shown in FIG. 17) is mounted between a light emitting diode and the corresponding phototransistor so as to vary the amount of light received by the phototransistors depending on the position (i.e., the deflection) of the corresponding shield. The amount of light received by the phototransistor produces a corresponding change in the effective resistance of the phototransistor as seen by the timer circuit (not shown) on the game card. This in turn effects the rate at which the timer circuit can charge its internal capacitors that determines the pulse width of the signal produced by the timer circuit—the higher the current the more rapidly the capacitor can be charged and vice versa. The pulse width of these timer signals can then be read by the personal computer in order to determine the signal level, and thus the received light intensity, of the phototransistors.

The two discrete switches 54 and 64 are also shown in FIG. 17. Switch 54 is coupled between the ground terminal 88 and a first discrete terminal 84 for producing a first discrete signal D1. Switch 64 is coupled between terminal 88 and a second discrete terminal 86 for producing a second discrete signal D2. Terminals 84 and 86 are coupled to respective pull-up resistors on the game board (not shown). Therefore, when the switches are closed, a logic low signal is produced whereas when the switches are open, as shown in FIG. 17, a logic high signal is produced. Thus, the discrete signals D1 and D2 are active low.

Terminals 82–92 form an electrical interface through a connector 120 (FIG. 18) that is compatible with the industry-standard game port that is included on all IBM-compatible personal computers. This interface is also compatible with the game port interface described in commonly assigned, co-pending application entitled "Video Game Card Having Interrupt Resistant Behavior," Ser. No. 08/334,877, filed Nov. 4, 1994, incorporated herein by reference. Therefore, the signals generated by the controller can be read by a personal computer and interpreted by the computer as taught herein.

II. VIDEO PINBALL SIMULATION SYSTEM

A. System Configuration

Figure 18:
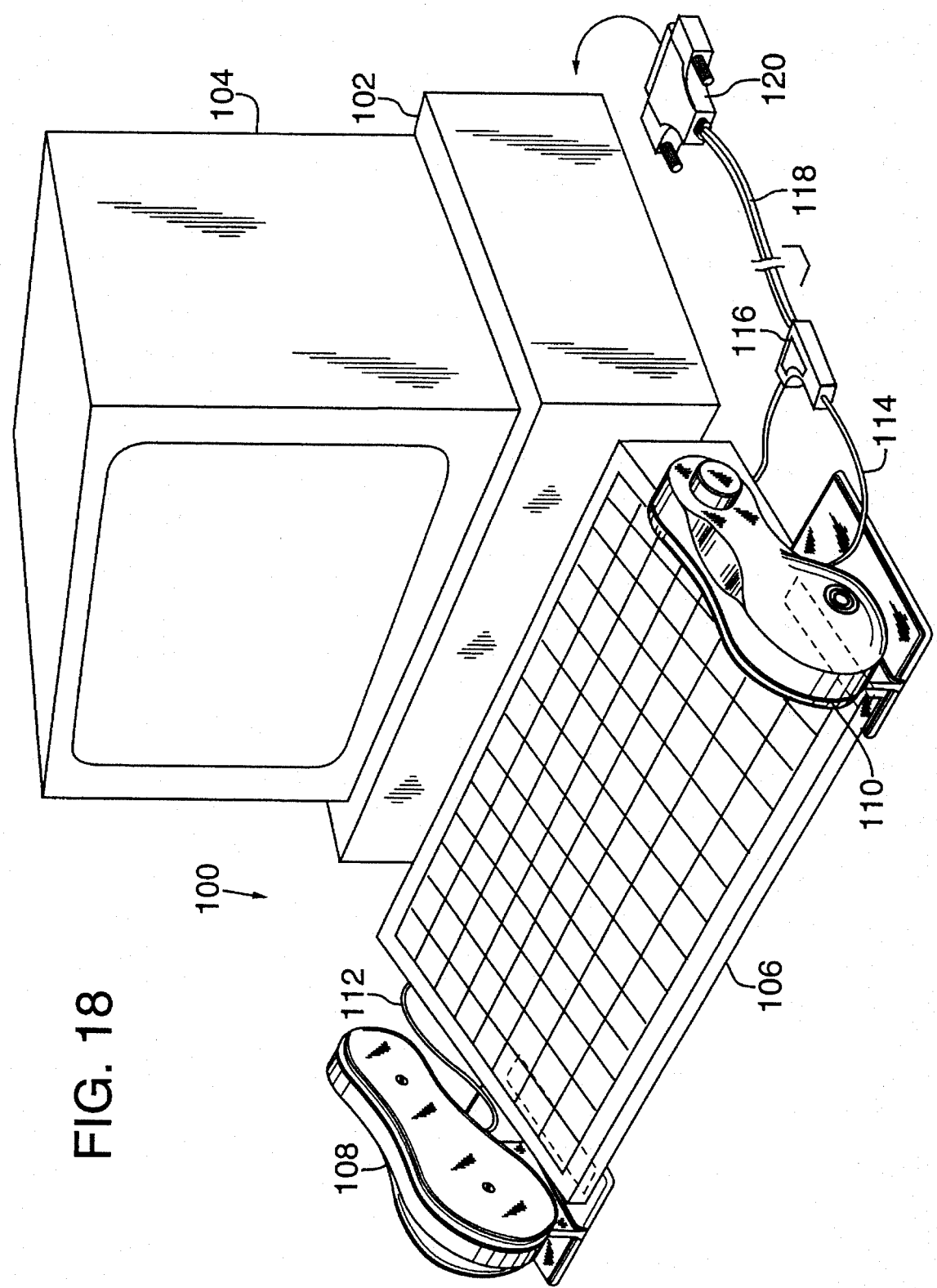
FIG. 18 is a video pinball simulation system including two of the controllers shown in FIG. 1.

A video pinball simulation system 100, which uses two of the controllers according to the invention, is shown in FIG. 18. The system includes two video pinball machine controllers 108 and 110 according to the invention, and a personal computer. Controller 110 is the same as controller 10 described above; controller 108 is a mirror image thereof. The personal computer further includes a monitor 104, a central processing unit (CPU) 102, and a keyboard 106. The keyboard 106 is coupled to the CPU 102 via a keyboard cable (not shown), as is known in the art. The central processing unit 102 includes the standard computer hardware found in an IBM-compatible computer. Among that hardware is a microprocessor that executes computer software stored within the personal computer and a storage device (memory) that has stored thereon operating system software and pinball simulation software. The software is discussed further below.

Figure 14:
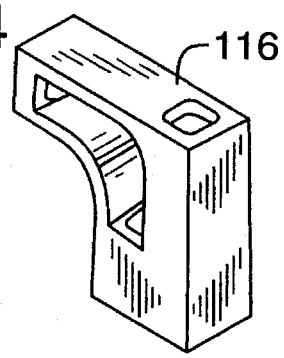
FIG. 14 is an enlarged perspective view of a wiring harness of the controller of FIG. 10.

Each game controller 108 and 110 includes a separate cable 112 and 114, respectively, that are coupled together via a cable 118 having a connector 120 that is compatible with the industry-standard game port interface. The two cables 112 and 114 are combined into the single cable 118 by a wiring harness 116, as shown further in FIG. 14. The connector is mated with a corresponding connector on a game board card inserted into the back of the CPU 102 (not shown), as is known in the art. The connector 120 provides the discrete and analog signals from the game controllers to the computer 66.

The game board can take on several forms. The controllers are compatible with both the dual-ported game card as shown in commonly-assigned U.S. Pat. No. 5,245,320 issued to Bouton and the game card described in commonly-assigned, co-pending application entitled "Video Game Card Having Interrupt Resistant Behavior," Ser. No. 08/344,877, filed Nov. 4, 1994, which is the preferred embodiment of the game card.

The game controllers 108, 110 provide four discrete signals corresponding to the flipper control switches and four analog signals corresponding to the optical accelerometers. The game board converts the analog signals, as is known in the art, to digital signals having a pulse width proportional to the amplitude of the analog signal by the timer circuits on the game board. The CPU microprocessor then determines the corresponding analog signal level by reading the pulse width of the digital signal. The discrete signals, on the other hand, can be read directly by the CPU because they are digital voltage levels.

In the preferred embodiment, the two controllers 108 and 110 are mounted on opposite sides of the keyboard 72. A fastener such as a hook and eye material (e.g., Velcro®) can be used to secure the controllers to the keyboard. The Velcro® can either be applied to a portion of the top side of the bases and to the underside of the keyboard (shown in dashed lines in FIG. 18) or to the sides of the controller and keyboard. Alternatively, the game controllers can be semi-permanently mounted on a desk or table to prevent them from moving when the controllers are jarred or when a force is applied by the user. This can be accomplished again by attaching Velcro® to the bottom side of the bases and to the desk or table on which the system is mounted.

B. Video Pinball Simulation System Software

The system software includes two separate yet interrelated programs: the operating system software and the pinball simulation software. The operating system software, for example, can be the Disk Operating System (DOS), Windows, or Windows95, all by Microsoft Corp., or OS/2 by IBM for an 80×86 based personal computer or System 7.X if an Apple personal computer is used. The preferred embodiment discussed below assumes the former. There are several commercially available pinball simulation software programs that can be adapted to work in the system 100. The program selected depends on the particular operating system being used. Examples include "Crystal Caliburn" by Little Wing or "Pinball for Windows" by Dynamix as well as the pinball program provided with Windows95.

Figure 19:
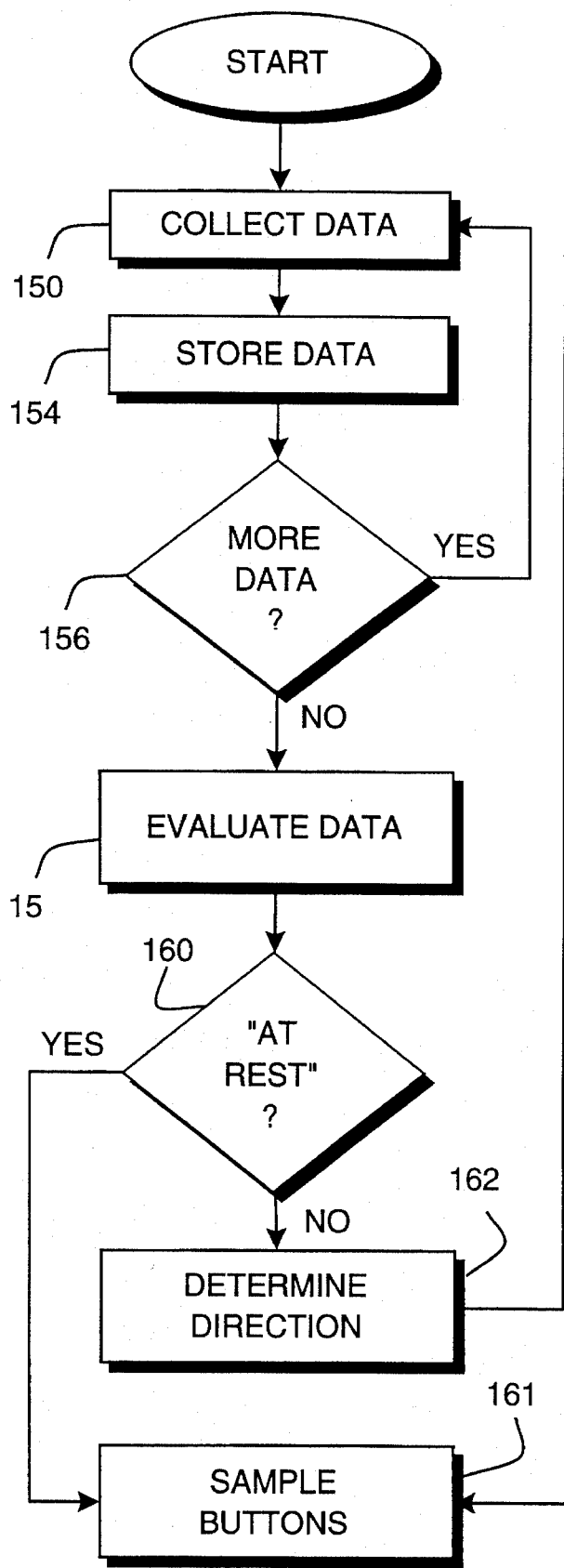
FIGS. 19 and 20 are flow charts of controller software.
Figure 19:
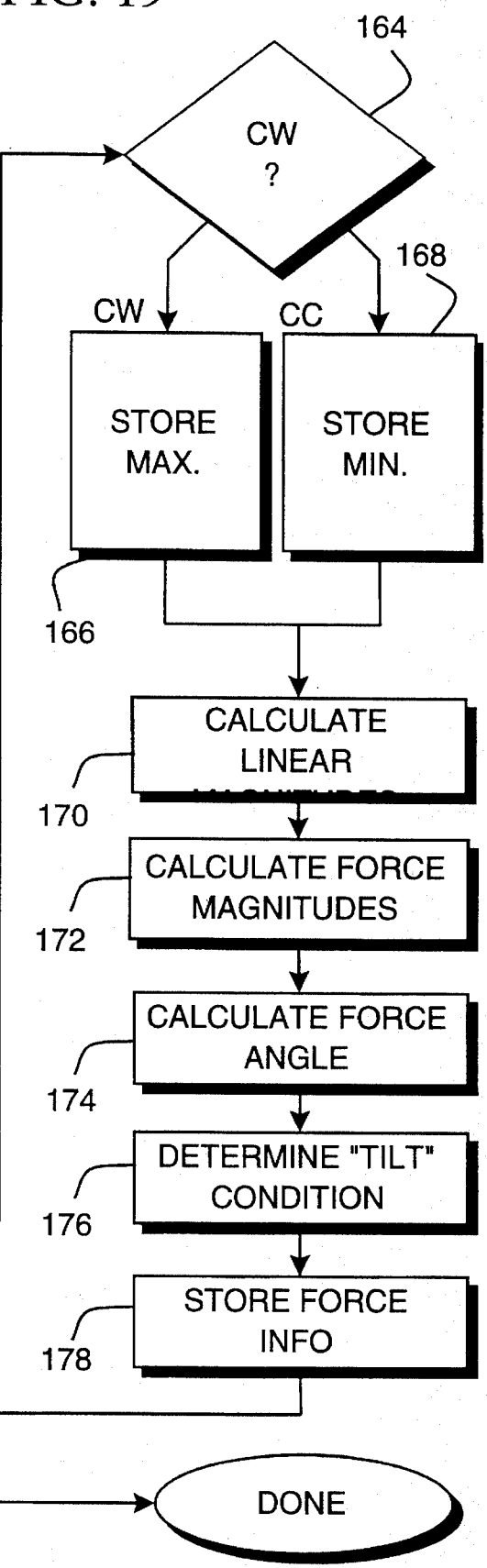

In the preferred embodiment, the video pinball simulation program is modified to read and process the signals generated by the game controllers. A flow chart showing a method of reading and processing the game controller signals is shown in FIG. 19. This method begins by acquiring a plurality ("N") of data sets from the game port. The number of data samples in each set is chosen to ensure that the software reads the entire pulse width of the analog signals on the game port. This number is in turn a function of the speed at which the computer can sample the game port. In the preferred embodiment, the number of data samples per set is equal to 20, assuming a 33 MHz 80486-based computer. The number "N" of data sets is chosen to ensure that the software can detect the peak excursion of the shield about its neutral "at rest" point. Since the computer can sample the controller faster than the accelerometer can respond to an applied force, several data sets are required to determine the peak excursion and, therefore, the magnitude of the applied force.

Acquiring these data samples is accomplished in steps 150 through 156. In step 150, an individual data sample is collected by reading the game port, as is known in the art. For purposes of speed, an assembly language routine can be written that implements this function. The data sample includes 8 bits, four of which correspond to the four analog signals generated by the game controllers while the other four correspond to the four digital or discrete signals generated by the dual stage flipper switches of the game controllers. Next, the data sample is stored in a corresponding entry in a table (step 154), which is preferably organized as a two dimensional array, where one of the dimensions corresponds to the particular data set and the other to the particular data sample within that set. If all of the data samples have not been collected, which is determined in step 156, these two steps are repeated until all of the data has been collected. Because of the particularities of the game port interface, for each new data set the software must write to the game port address to reinitialize the analog signal levels.

After all N sets of data have been collected, the data is evaluated in step 158 to determine whether any force has been applied to the game controllers. This is determined by comparing the analog signal levels generated by the accelerometers, as represented by the corresponding bits in the sample data, to an "at rest" signal level. This step thus requires that the software process the sample data to determine the analog signal levels of each of the accelerometers. If that signal level corresponds to an "at rest" signal level, then the accelerometers must be in their "at rest" position. In the preferred embodiment, as described above, the "at rest" position corresponds to a mid-point signal level since the shield pattern permits only 50% of the light to pass in this position. If the game controllers are oriented differently in the "at rest" position, the "at rest" signal level would vary accordingly. The calibration process described below with reference to FIG. 20 can be used to establish the "at rest" signal levels in those cases. In addition, the software can be designed to allow for a certain amount of variation about the "at rest" position and still be considered "at rest."

If the sample data indicates that the game controllers are not currently being subjected to a force, i.e., the controllers are "at rest," step 161 is executed in which the state of the flipper control switches are sampled. In this step, the four bits corresponding to the flipper switches are analyzed to determine whether a flipper switch has been actuated. If so, the software actuates the corresponding flipper switches on the graphical display.

If the game controllers are not at rest, the method proceeds to step 162 wherein the initial direction of motion of the controllers is determined. This is accomplished by determining if the analog signal levels are increasing or decreasing from their initial "at rest" condition. Because the shield hangs freely about its midpoint, in the preferred embodiment, its maximum excursion about its initial "at rest" position can either correspond to a signal level less than this "at rest" level or in excess of the "at rest" level detected depending upon the direction of the motion. To account for this, the method first determines the initial direction of motion. This is done for each controller and each axis of each controller.

Step 164 determines whether, for each controller axis, the initial controller direction is clockwise (CW) or counterclockwise (CCW). These directions are measured with respect to the plane within which the shield pivots. If the initial direction is clockwise, the method searches through the data to find the maximum signal level to this axis and this controller. If, on the other hand, the initial direction is counterclockwise, then the minimum signal level corresponds to the peak excursion of the shield and, thus, the force applied to the controller. This signal level is then used to calculate the force in the steps below. Steps 164–168 are then repeated for each axis of each controller.

Once the signal levels corresponding to the peak excursions of the shields are ascertained, a "linear" magnitude for both axes of the game controllers are calculated. This step includes converting the signal level, as represented by the pulse width of the corresponding game port signal, to a force. As is known in the art of physics, this is a function of the mass of the shield as well as the response of the photodetectors and the timer circuit on the game board, both of which have certain nonlinearities.

A force magnitude is then calculated in step 172 for each controller. This is done by taking the "root-sum-square" of the two linear magnitudes corresponding to the two axes of a particular controller. This is simply an application of the Pythagorean theorem to find the length of a hypotenuse of a fight triangle whose base and height are represented by the two linear magnitudes.

The angle of the force is next calculated in step 174 by taking the arc-tangent of the linear magnitudes, as is known in the art. This step also determines which quadrant in a cartesian coordinate system the force is applied to and compensates accordingly.

Both the force magnitudes and angles are then stored for use by the video pinball simulation program in step 176.

These forces are used in primarily two ways. First, to calculate a permissible amount of "slide" and second to determine whether a "tilt" condition exists. A tilt condition exists when the applied force exceeds a predetermined level of force. This is determined by comparing the force information as calculated in steps 170–174 to the predetermined level. If such a condition exists, the video pinball simulation software will typically terminate the game, as would be true in a real pinball machine.

The simulation software also uses the force information to determine the amount of "slide" and to adjust the video graphics accordingly. The simulation program uses the force information to predict how the simulated pinball machine, as represented graphically on the screen, would move in response to this applied force. This program then adjusts the graphical images to account for this force. Thus, the system according to the invention allows for both "slide" and "tilt" as set forth in the objects of the invention. The software also samples the buttons in step 161 and actuates the flippers accordingly.

Because both controllers provide information about the same force, the simulation software can either select which set of analog signals to use for a given force or, alternatively, combine the two sets of signals to form a unified signal set. If only one set of analog signals is used, the software selects the set having the highest magnitude because it can be safely assumed that the force was applied at that controller. If, on the other hand, the software combines the two sets, it can do this by simply calculating the average of the two sets. More sophisticated software, however, can use both sets of data simultaneously to apply different forces to different ends of the simulated pinball machine. The software can also contain a filter routine that filters out an unwanted bounce or oscillation to detect only the initial force.

In the preferred embodiment, the method shown in FIG. 19 is included as a part of the video simulation program. In an alternative embodiment, the force information can be converted to corresponding keyboard inputs and stored in a keyboard input buffer using a so-called "terminate and stay resident" program (TSR). Although this latter approach is not preferred, it can be employed to allow the game controllers of the present invention to operate in conjunction with existing video pinball simulation programs that are not modified in the manner described above.

Figure 20:
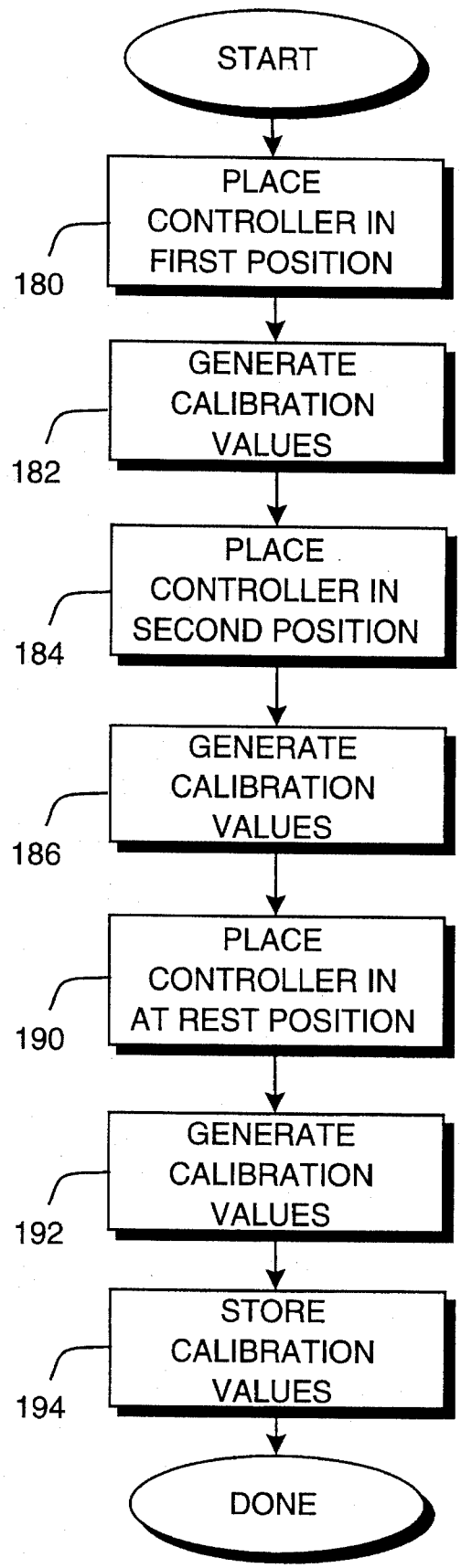

The preferred embodiment of the video pinball simulation software also includes a calibration routine shown in FIG. 20. The calibration routine allows the game controllers to be calibrated by sampling the game controller analog signal levels when the accelerometer shields are at certain predetermined positions. This calibration routine is important because of the wide variation in the photodetectors used in the present invention. As is known in the art, the current gain ($\beta$) of phototransistors vary widely from lot to lot. As a result, the current produced by any two phototransistors for the same level of light intensity can vary. The calibration routine compensates for this variation. In addition, the response of the timer circuit used on the game boards have certain nonlinearities. The calibration routine also compensates for these nonlinear effects.

The calibration routine shown in FIG. 20 is performed for each axis of the game controller so that both accelerometers can be calibrated. For the system shown in FIG. 18, this can be accomplished by executing the calibration routine twice: once for the first axes of the game controllers 108 and 110 and once for the second axes thereof. This will become more apparent as the calibration routine is described in detail.

The calibration routine begins at step 180 where the game controller is placed in a first position corresponding to the maximum signal level of the accelerometer which is being calibrated. The computer can provide instructions to the user, such as displaying the controller in the first position, to aid the user in performing the calibration function. In the system shown in FIG. 18, this position corresponds to rotating the controllers clockwise toward the personal computer until the shield abuts a stop.

Once the controller is placed in the first position, the computer polls the game board to determine the signal levels corresponding to these positions. The calibration routine can either wait for a predetermined amount of time before polling the game board or request the user to press a keyboard key or flipper switch to indicate when the controller is in the first position. Only two of the four analog signals are relevant to this step. These signal levels are then stored and used as calibration values by the video pinball simulation program.

The controllers are then placed in a second position corresponding to the minimum signal level generated by the accelerometers currently being calibrated. In the system shown in FIG. 18, this position corresponds to rotating the controllers counterclockwise, i.e., away from the computer, so that the shields abut the opposite stop. The computer then reads the signal levels generated by the accelerometers currently being calibrated after ensuring the controller is placed in the second position in a manner described above. The system then stores these calibration values as it did for those in step 182.

Finally, the controller is placed in an "at rest" position at 190. For the system shown in FIG. 18, this corresponds to having the base of the controllers in a horizontal position. The computer then polls the game board to determine the signal levels corresponding to this position. The signal levels corresponding to this "at rest" position are particularly important since these values are used by the simulation software to determine whether or not the controllers are currently "at rest" (see step 160 in FIG. 19).

Once all three of these calibration values are known, the software can estimate the response of the accelerometer, i.e., the photodetector, as a function of angular position by forming a piecewise linear function. This characterization function can then be used to more accurately calculate the force applied in steps 170–174 described above.

This calibration routine is then repeated for the other axis of the controller. The routine is essentially the same except the first and second positions are different.

The calibration routine described above can be simplified by making certain assumptions. In this simplified approach, just the "at rest" signal levels are determined and a predetermined characterization function can be fitted to single data point.

Having described and illustrated the principles of the invention in a preferred embodiment thereof, it should be apparent that the invention can be modified in arrangement and detail without departing from such principles. For example, the controller is not limited to the use of a game port. Other input ports such as a keyboard port can be used. In that case the analog and digital signals can be converted to corresponding keycodes that are then transmitted to the computer through the keyboard port as taught in commonly-assigned, co-pending application entitled "RECONFIGURABLE JOYSTICK CONTROLLER WITH MULTI-STAGE TRIGGER AND RECALIBRATION," filed Jan. 5, 1994, Ser. No. 08/177,625. Alternatively, the digital and analog signals produced by the controllers can be formatted in a manner to be compatible with and ADB bus used on Apple Computers. We claim all modifications and variations coming within the spirit and scope of the following claims:

What is claimed is:

1. A video pinball machine controller for use with a personal computer, the controller comprising:

a base;

a handle mounted on the base;

an accelerometer mounted on the controller along a first axis that produces a signal proportional to an amount of force applied to the handle transversely to the first axis; and means coupled to the accelerometer for transmitting the signal to the personal computer.

2. A controller according to claim 1 wherein the accelerometer includes:

a light source;

a light detector;

a light intensity modulator positioned between the source and detector and movable between first and second positions to vary a light intensity received by the detector; and a mass coupled to the modulator to move the modulator in reaction to an accelerative force applied to the handle.

3. A controller according to claim 2 wherein the light intensity modulator includes a shield having a pattern formed thereon that varies from a first end of the shield to a second end of the shield so as to allow an increasing amount of light to pass through the shield from the first end to the second end, the shield being pivotally mounted between the light source and light detector so that the force applied to the handle causes the shield to pivot thereby causing an amount of light to be detected by the light detector that is proportional to the force.

4. A controller according to claim 3 wherein the shield includes a grayscale pattern formed thereon that varies increasingly from the first end of the shield to the second end of the shield.

5. A controller according to claim 3 wherein the shield includes a slot formed thereon having a width that varies increasingly from the first end of the shield to the second end of the shield.

6. A controller according to claim 3 wherein the shield is comprised of a quadrant of translucent plastic.

7. A controller according to claim 6 wherein the mass comprises a frame encasing the translucent plastic.

8. A controller according to claim 2 wherein the light source includes:

a light emitting diode; and a resistor connected in series with the light emitting diode.

9. A controller according to claim 2 wherein the light detector includes:

a phototransistor having a base, a collector, and an emitter coupled to a first supply voltage terminal for receiving a first supply voltage (GND);

a first resistor coupled between the collector and a second supply voltage terminal for receiving a second supply voltage (VCC); and a second resistor coupled between the collector and an analog signal terminal for providing an analog signal (A1) that is proportional to the amount of light received by the phototransistor.

10. A controller according to claim 1 further comprising a second accelerometer mounted on the controller along a second axis that produces a signal that indicates an amount of force applied to the handle along the second axis.

11. A controller according to claim 10 wherein the second axis is perpendicular to the first axis.

12. A controller according to claim 1 in which the means for transmitting includes:

a cable coupled to the accelerometer at a first end of the cable; and a game port connector coupled to a second end of the cable for coupling the accelerometer signal to a game port of a personal computer.

13. A controller according to claim 1 further comprising a dual-stage switch mounted on the handle and the means for transmitting includes conductors coupled to the switch for transmitting first and second switch signals to the personal computer.

14. A controller according to claim 13 wherein the dual-stage switch includes:

a first switch that produces the first signal responsive to actuation thereof;

a second switch that produces the second signal responsive to actuation thereof; and a spring interposed between the first and second switch.

15. A controller according to claim 1 wherein the handle includes:

a dome-shaped portion adapted to receive a palm of a user's hand;

a neck portion extending away from the dome-shaped portion and forming an actuator portion; and a push button-type switch mounted on the actuator portion of the handle in position for actuation by the user's index finger when the user's palm is engaging the dome-shaped portion.

16. A controller according to claim 15 wherein the handle is offset from the base by an acute angle.

17. A video pinball simulation system comprising:

a computer;

pinball simulation so&ware running on the computer; and a video pinball machine controller coupled to the computer, the controller having at least one user actuated input device for inputting stimuli into the computer, the computer being responsive to the stimuli under control of the pinball simulation software to produce a corresponding simulation response.

18. A video pinball simulation system according to claim 17 further comprising a second said video pinball machine controller coupled to the computer.

19. A video pinball simulation system according to claim 17 wherein the computer includes a game port and the video pinball machine controller is coupled to the game port.

20. A video pinball simulation system according to claim 17 wherein the controller includes:

a base;

a handle mounted on the base; and an accelerometer mounted on the controller along a first axis that produces a signal proportional to an amount of force applied the handle transversely to the first axis.

21. A video pinball simulation system according to claim 20 including a second said controller and means for transmitting signals from each of said controllers to the computer.

22. A video pinball simulation system according to claim 20 wherein the pinball simulation software includes means for generating a tilt condition when the signal exceeds a predetermined level.

23. A video pinball simulation system according to claim 20 wherein the controller includes a dual-stage switch mounted on a distal end of the handle to be actuated by a user's index finger when the user grasps the handle, the switch having a first stage and a second stage.

24. A video pinball simulation system according to claim 23 wherein the pinball simulation software includes:

means for actuating a first flipper responsive to actuation of the first stage of the dual-stage switch; and means for actuating a second flipper responsive to actuation of the second stage of the dual-stage switch.

25. A method of simulating a pinball machine using a computer executing a pinball software simulation program that displays video graphics of a pinball machine, the method comprising:

providing a first video pinball machine controller;

detecting a force applied to the controller by a user;

generating a signal proportional to the force;

transmitting the signal to the computer executing the pinball simulation software;

reading the signal by the computer;

converting the signal to a corresponding force value; and producing a change in the video graphics responsive to a predetermined force value.

26. A method of simulating a pinball machine according to claim 25 wherein the step of detecting a force applied to the controller includes:

detecting a first force applied along a first axis of the controller; and detecting a second force applied along a second axis of the controller.

27. A method of simulating a pinball machine according to claim 26 wherein the step of converting the signal to a corresponding force includes combining the first and second forces.

28. A method of simulating a pinball machine according to claim 25 further comprising:

providing a second video machine pinball controller.

detecting a second force applied to the second controller;

generating a second signal proportional to the second force;

transmitting the second signal to the computer;

reading the second signal by the computer;

converting the second signal to a corresponding force value; and producing a change in the graphics responsive to the force value corresponding to the second signal.

29. A method of simulating a pinball machine according to claim 25 wherein the step of detecting a force applied to the controller includes detecting an amount of light that is proportional to the force applied to the controller.

30. A method of simulating a pinball machine according to claim 29 wherein the step of detecting an amount of light that is proportional to the force applied to the controller includes providing an optical accelerometer that produces a signal that is proportional to the force.

31. A method of simulating a pinball machine according to claim 25 wherein the step of transmitting the signal to a computer executing pinball simulation software includes transmitting the signal over a game port of the computer.

32. A method of simulating a pinball machine according to claim 31 wherein the step of converting the signal to a corresponding force includes:

generating a digital pulse having a pulse width corresponding to a level of the signal;

reading the width of the pulse; and converting the width to the force value.

33. A method of simulating a pinball machine according to claim 25 further comprising:

comparing the force value to a predetermined limit; and generating a tilt condition if the force value exceeds the predetermined limit.

34. A method of simulating a pinball machine according to claim 25 further comprising the step of calibrating the signal.

35. A method of simulating a pinball machine according to claim 34 wherein the step of calibrating the signal includes:

tilting the controller to a first position;

reading the signal by the computer when the controller is in the first position;

tilting the controller to a second position; and reading the signal by the computer when the controller is in the second position.

36. A method of simulating a pinball machine according to claim 35 wherein the step of tilting the controller to a first position includes rotating the controller clockwise in a first plane; and wherein the step of tilting the controller to a second position includes rotating the controller counter-clockwise in the first plane.

37. A method of simulating a pinball machine according to claim 36 wherein the step of tilting the controller to a first position includes rotating the controller clockwise in a second plane; and wherein the step of tilting the controller to a second position includes rotating the controller counterclockwise in the second plane.

38. A method of simulating a pinball machine according to claim 36 wherein the second plane is perpendicular to the first plane.

39. A method of simulating a pinball machine according to claim 34 wherein the step of calibrating the signal includes:

positioning the controller in an at rest position; and reading the signal by the computer when the controller is in the at rest position.

40. A method of simulating a pinball machine according to claim 39 wherein the step of converting the signal to a corresponding force value includes compensating for the at rest signal.

41. A video pinball machine controller for use with a personal computer, the controller comprising:

a horizontal base;

a handle mounted on the base and having a dome-shaped portion adapted to receive a palm of a user's hand and a neck portion extending away from the dome shaped portion and forming an actuator portion at a distal end of the handle opposite the dome-shaped portion;

a switch mounted on the actuator portion of the handle in position to be actuated by the user's index finger; and a cable coupled to the switch for transmitting switch signals to the personal computer.

42. A video pinball machine controller according to claim 41 further comprising a vertical pedestal connected between the base and the handle.

43. A video pinball machine controller according to claim 41 wherein the handle is offset from the base by an acute angle.

44. A video pinball machine controller according to claim 41 wherein the switch includes a dual-stage switch mounted on the handle.

45. A video pinball machine controller according to claim 44 wherein the dual-stage switch includes:

a first switch;

a second switch; and a spring interposed between the first and second switch to allow actuation of the first switch responsive to a first amount of force applied to the first switch and to allow actuation of the second switch responsive to a second amount of force, greater than the first force, applied to the first switch.

46. A video pinball machine controller according to claim 41 wherein the neck portion of the handle is sized and shaped so that the user can curl a thumb and ring finger around the neck portion while resting the palm on the dome shaped portion and actuating the switch on the actuator portion with the index finger.

47. A video pinball machine controller for use with a personal computer, comprising:

a base;

a handle mounted on the base and sized and shaped to be grasped in a user's hand; and a dual-stage push-button mounted on the handle in position to be depressed by one of the user's fingers; the push-button including a first stage switch, actuable on depressing the push-button by a first amount and a second-stage switch actuable by depressing the push button by a second amount exceeding the first amount.

48. A video pinball machine controller according to claim 47 in which:

the second switch is supported against an interior side of a first wall of the housing;

the first switch is coupled to the second switch inside the housing by a coil spring; and the push button is coupled to the first switch through an opening in a second wall of the housing.

* * * * *